United States Patent [19]

Camloh et al.

[11] Patent Number: 4,717,297

[45] Date of Patent: Jan. 5, 1988

[54] SUPPORT AND GUIDE FOR MULTIPLE SPINDLE HEAD

[75] Inventors: William J. Camloh, Lafayette; Charles Alcott, Canastota, both of N.Y.

[73] Assignee: Camloh Industries, Inc., Tully, N.Y.

[21] Appl. No.: 941,056

[22] Filed: Dec. 12, 1986

[51] Int. Cl.⁴ .............................................. B23C 9/00
[52] U.S. Cl. .................................. 409/144; 409/185; 409/203
[58] Field of Search ............... 409/234, 203, 213, 217, 409/204, 209, 144, 185, 239, 241

[56] References Cited

U.S. PATENT DOCUMENTS

| | | | |
|---|---|---|---|
| 3,064,540 | 11/1962 | Frushour et al. | 409/185 |
| 3,114,294 | 12/1963 | Wright | 409/144 X |
| 3,187,634 | 6/1965 | Onsrud et al. | 409/204 |
| 3,195,413 | 7/1965 | Müller | 409/217 |
| 3,641,873 | 2/1972 | Jacques | 409/185 |
| 3,806,691 | 4/1974 | Roach | 409/185 X |

FOREIGN PATENT DOCUMENTS

| 780986 | 11/1980 | U.S.S.R. | 409/144 |
|---|---|---|---|

*Primary Examiner*—William R. Briggs
*Attorney, Agent, or Firm*—Bruns and Wall

[57] ABSTRACT

A support bracket and guide assembly is employed with a multiple spindle head or other milling device to be mounted on a milling machine. A support bracket mounted on the horizontal dovetail ways of the machine holds a guide plate in which a vertical guide bar is slidably disposed. A slider mounted at the foot of the guide bar rides on an arcuate horseshoe member whose center is positioned at the axis of the device input shaft. The slider is tightened on the horseshoe member at a desired angle.

11 Claims, 5 Drawing Figures

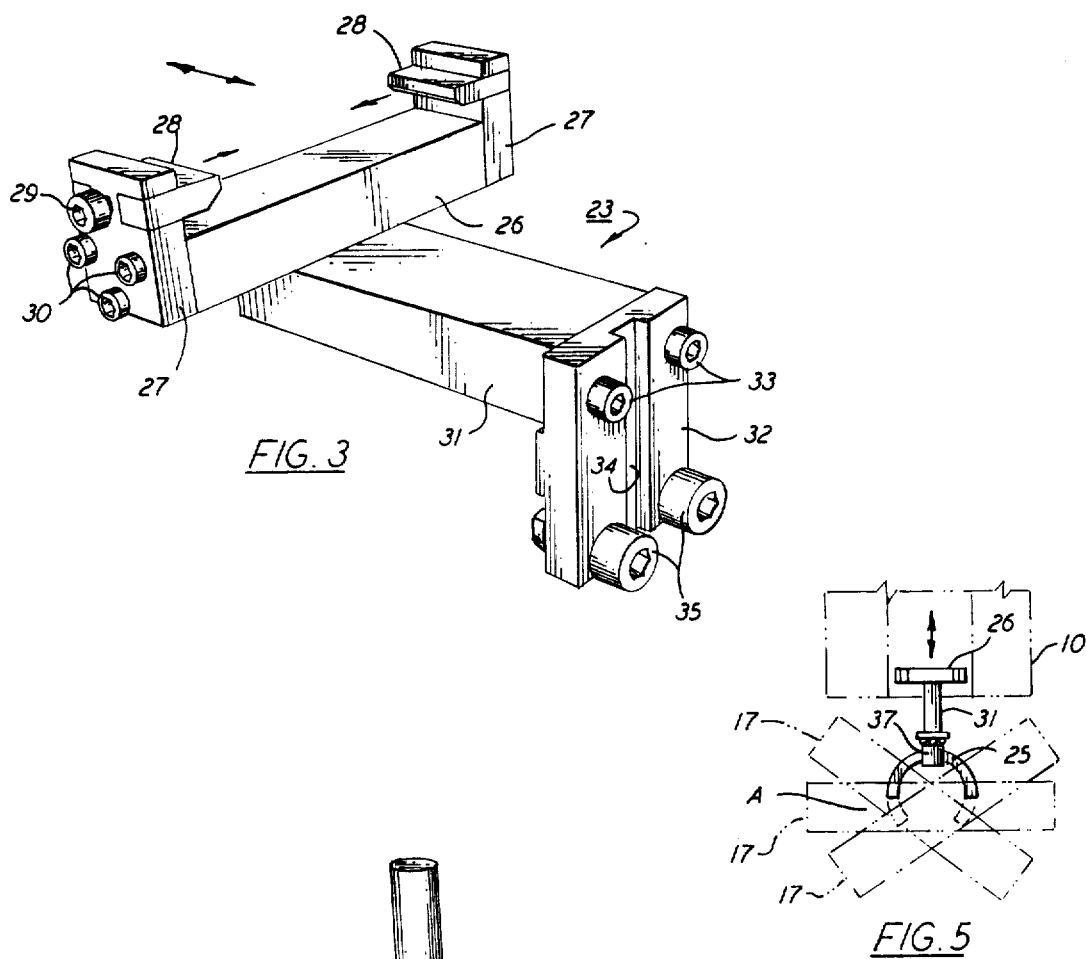
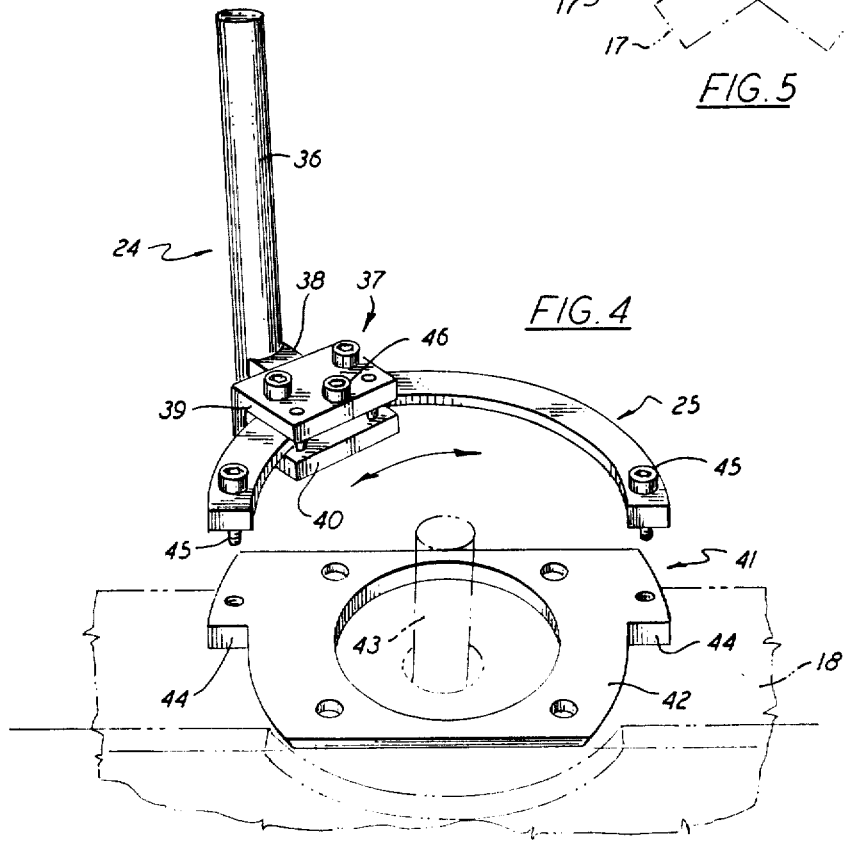

SUPPORT AND GUIDE FOR MULTIPLE SPINDLE HEAD

BACKGROUND OF THE INVENTION

This invention relates to milling or machining apparatus and accessories, and is more especially directed to a support and guide mechanism for a multiple spindle head or spindle multiplier used with a milling machine.

A multiple-spindle head or spindle multiplier is a milling device employed with a vertical milling machine nnd has a single input drive shaft and, for example, three output spindles for driving a like number of rotary machining tools, such as a drill bit, an end mill, a router, or the like. These tools can be of the same or of different sizes. The spindle multiplier drive shaft fits into the drive spindle of the milling machine, and the multiplier is suspended from the spindle quill. A multiple spindle head of this type is described in my copending patent application Ser. No. 938,597.

The spindle multiplier, however, has a tendency to move if left unsupported.

No suitable supporting mechanism is currently available that would permit movement of the multiple spindle device laterally or vertically, but which would hold the same at a selected angle and prevent unwanted rotation of the device.

OBJECTS AND SUMMARY OF THE INVENTION

Accordingly, it is an object of this invention to provide a support bracket and guide for a multiple spindle head which avoids the above-mentioned problems.

It is a more particular object of this invention to provide such a support bracket and guide which connects simply on horizontal ways of the milling machine and which permits freedom of movement up and down as well as laterally, but which prevents undesired rotation of the supported device.

It is yet another object of this invention to provide a support bracket and guide which permits the multiple spindle head to be set at any desired angle.

In accordance with an aspect of this invention, a support bracket and guide assembly for a multiple spindle head is adapted to be mounted on a milling machine and to support a multiple spindle head of the type that comprises an elongated housing, an input shaft extending above the housing to fit in the rotary output spindle of the milling machine, a number of output spindles that are disposed at an underside of the housing, and a belt drive, chain drive, gear drive, or other equivalent transmission linkage in the housing to carry the rotary motion from the input shaft to the output spindles. In a preferred embodiment, a mounting ring or equivalent mounting plate is provided on the multiple spindle head at the location of the input shaft, and a split-cylinder collar is removably mounted on the mounting plate around the input shaft for clamping onto a non-rotating part of the output spindle of the milling machine.

The support bracket and guide assembly comprises a support bracket, an arcuate horseshoe member, a vertical guide bar, and a slider. The support bracket has dovetailing members that mount onto the dovetail ways of the milling machine, a guideplate that has a vertical channel formed in it, and a support for supporting the guide plate on the dovetail clamping mechanism. The horseshoe member is mounted on the multiple spindle head mounting plate to have its center of curvature located at the axis of the input shaft. The vertical guidebar is connected to the slider and is received in the vertical channel of the guideplate. The slider has upper and lower flanges which sandwich the horseshoe member between them, and has set screws or other clamping devices to clamp the slider onto the horseshoe member at a desired position to establish an angular position of the multiple spindle head relative to the milling machine table.

The above and many other objects, features, and advantages of this invention will be more fully understood from the ensuing detailed description of the preferred embodiment, which is to be considered in connection with the accompanying drawing.

BRIEF DESCRIPTION OF THE DRAWING

FIG. 3 is a perspective view illustrating the support bracket and guide plate of the preferred embodiment.

FIG. 4 is another perspective view showing the guide bar, slider, horseshoe member, and mounting plate of the multiple spindle device, as in the preferred embodiment.

FIG. 5 is a plan schematic view for illustrating the operation of this invention.

DETAILED DESCRIPTION OF THE PREFERRED EMBODIMENT

Figure 1:
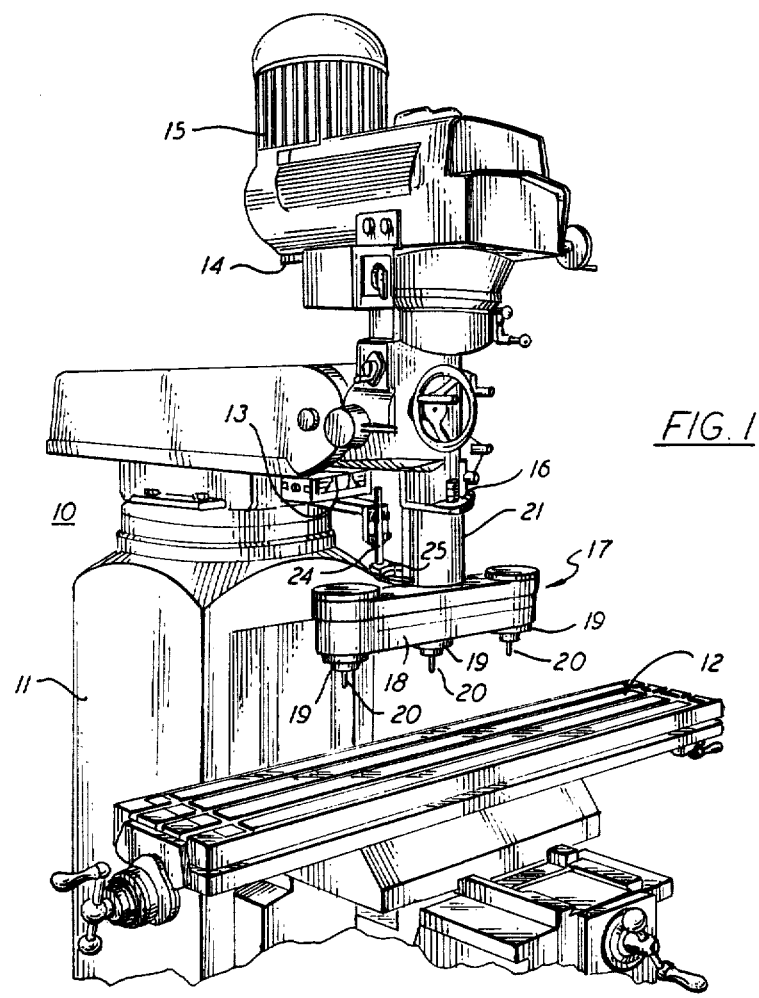
FIG. 1 is a perspective view of a vertical milling machine on which is mounted a multiple spindle device and a support bracket and guide assembly according to one embodiment of this invention.

With reference to the drawing, and initially to FIG. 1, a vertical milling machine 10 is shown to have a base 11 on which is mounted a horizontal table 12. Dovetail ways of the milling machine 10 are disposed above the base 11, and a power head 14 is mounted above the ways 13. Shown on the power head 14 are an electric motor 15 and a spindle 16 from which a spindle multiplier 17 or multiple spindle head is suspended.

The spindle multiplier 17 has an elongated housing 18 with three output spindles 19, 19, 19 on its underside, to which machine tools 20, which can be end mills, routers, drill bits, etc., are connected. A collar 21 is situated over the input shaft of the spindle multiplier 17, and is also clamped onto a non-rotating quill of the spindle 16 of the milling machine head 14.

Figure 2:
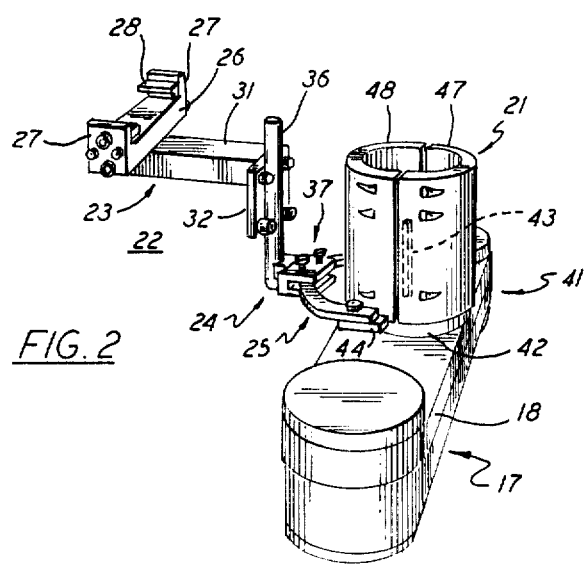
FIG. 2 is another perspective view showing the multiple spindle device and the support bracket and guide assembly of this embodiment.

A support and guide assembly 22 for the spindle multiplier 17, shown in somewhat more detail in FIG. 2, is generally formed of a support bracket 23 which attaches to the dovetail ways 13 of the milling machine 10, a guide bar assembly 24, and an arcuate horseshoe member 25 which is firmly mounted to an upper surface of the spindle multiplier housing 18.

As shown in more detail in FIG. 3, the support bracket 23 comprises a horizontal mounting bar 26 which has end plates 27 on either end thereof. Dovetailing clamping plate members 28 are slidably supported on the end plates above the mounting bar 26, and extend towards one another. These members 28 are chamfered on a lower surface thereof to fit into the dovetail ways 13. Adjusting screws 29 in the respective end plates 28 move the dovetailing members 28 laterally into and out of engagement with the ways 13. Mounting screws 30 are shown here for fastening the end plates 27 onto the mounting bar 26.

A horizontal support bar 31 extends laterally outward from the mounting bar 26 in the direction towards the machine spindle 16 and has a guide plate 32 mounted by machine screws 33 onto its distal end. A vertical channel 34 is formed on a forward surface of the guide plate 32 and rollers 35 are disposed one on each side of the channel 34.

The guide bar assembly 24 and horseshoe member 25 are shown in somewhat greater detail in FIG. 4. The guide bar assembly includes a vertical guide bar 36 in the form of a steel cylindrical rod, and a slider 37 which slides on the horseshoe member 25. The slider 37 comprises a foot piece 38 which connects to the foot or lower end of the bar 36, and upper and lower flanges 39 and 40 which sandwich the horseshoe member 25. The horseshoe member 25 is a semicircular half ring, and is spaced away somewhat from said collar 21.

A mounting plate 42 is situated on the upper surface of the spindle multiplier housing 18 and the horseshoe member 25 is attached to the mounting plate 41. The mounting plate 41 as employed in this embodiment comprises a mounting ring 42 situated around an input shaft 43 of the spindle multiplier 17, and attached onto the housing 18. The mounting plate further has ears 44 which project laterally from the ring 43. Mounting screws 45 connect the ends of the horseshoe member 25 to these mounting ears 44.

One or more set screws 46 or other fastening devices situated on the slider 37 lock the same into a desired position along the horseshoe member 25. This mechanism is employed to establish a desired angle of the spindle multiplier 17 with respect to the milling machine 10, so that the rotary tools 20 are in a desired relationship with respect to the tooling machine table 12.

Returning to FIG. 2, the collar 21 is preferably a split cylinder having a front half 47 and a rear half 48 which are held together by cap screws. The collar 21 is removably mounted onto the mounting ring 42 of the spindle multiplier 17.

The assembly and operation of this device are generally as follows: initially, the support bracket 23 is mounted on the dovetail way, preferably flush with the end thereof; then the adjusting screws 29 for the dovetailing members 28 are tightened. The guide bar assembly 24 and the arcuate horseshoe member 25 are connected to the spindle multiplier 17, by attaching the mounting screws 45 into the mounting plate 41. This assembly is then placed on the milling machine table 12 in line with the support bracket 23. Then the collar 21 is removed from the spindle multiplier 17. If a tool holder or collet is required for the milling machine 10, that element can be connected to the drive shaft 43. The slider 47 is then moved to the center position on the horseshoe member 25, i.e., as shown in FIG. 2. The machine spindle 16 is brought down towards the table 12 to bring the shaft 43 with its tool holder or collet, completely into the spindle 16, and then the spindle collet is tightened with a draw bar or the like. The collar 21 is then replaced on the spindle multiplier 17 and over the quill of the machine spindle 16. The cap screws of the collar 21 tighten the two halves 47 and 48. These cap screws are turned to snug the collar 21 gently on the quill. At this time, the guide bar 36 rests on the vertical channel 34 of the guide plate 32 and is centered between the rollers 35. Now, the quill is raised so that the spindle multiplier 17 is suspended. A dial indicator on the table is employed to set the assembly to a zero position, employing a witness bar (not shown) on the spindle multiplier 17. In a preferred embodiment, one of the rollers 35 is fixed and the other is adjustable by means of an eccentric. The angle of the spindle multiplier 17 and the horseshoe 25 is variable over a wide range, as indicated in FIG. 5. When the spindle multiplier 17 is properly aligned with the table 12, the movable roller 35 is positioned on the guide bar 36 and is tightened. Then, the slider 37 is set in position on the horseshoe member 25 by tightening the set screw 46.

The support bracket and guide assembly of this invention will ensure accurate positioning of the several tools 20 in the spindle multiplier 17, with respect to the position of the milling machine table 12.

While the above disclosed embodiment employs a spindle multiplier 17, it should be recognized that this support bracket assembly could be employed with other milling devices which have a housing and an input shaft, and for which the rotational position of the housing is to be kept in proper alignment, and for which the rotational position is selectively variable.

While the invention has been described with respect to a single preferred embodiment, it should be recognized that the invention is not limited to that embodiment, and that many modifications and variations would present themselves to those of skill in the art without departing from the scope and spirit of this invention as defined in the appended claims.

What is claimed is:

1. Support bracket and guide assembly for a multiple spindle head to be mounted on a milling machine of the type which comprises a base, a table mounted on said base, a dovetail ways supported on said base, and a power head on said ways and having a rotary spindle to receive and rotate a tool shaft; the multiple spindle head comprising an elongated housing, an input shaft extending above said housing at a central portion thereof to fit said rotary spindle, a plurality of output spindles disposed at an underside of said housing, and transmission means in the housing to carry rotary motion from said input shaft to said output spindles; said multiple spindle head also comprising a mounting plate on said housing at the location of said input shaft, and a collar removably mounted on said mounting plate around said input shaft;
    said support bracket and guide assembly comprising:
    a support bracket including dovetail means to mount on said dovetail ways, a guide plate having a vertical channel means formed therein, and means supporting said guide plate on said dovetail means;
    an arcuate horseshoe member mounted on said multiple spindle head mounting plate to have a center of curvature at the axis of said input shaft;
    a vertical guide bar slidably received in the vertical channel means of said guide plate; and
    slider means affixed onto said guide bar for sliding along said arcuate horseshoe member and including clamping means to clamp said slider means onto said horseshoe member at a selected positin to establish an angular position of said multiple spindle head relative to the milling machine table.

2. The support bracket and guide assembly according to claim 1, in which said dovetail means include a mounting bar traversing said dovetail ways, plate members at the ends of said mounting bar, and clamping plates extending towards one another and parallel to said mounting bar in spaced relation thereto.

3. The supporting bracket and guide assembly according to claim 2, in which said supporting means includes a horizontal bar disposed on said mounting bar perpendicular thereto, and having said guide plate mounted at an end thereof.

4. The support bracket and guide assembly of claim 3 in which said guide plate has as said channel means a vertical channel disposed on a surface thereof that faces away from said mounting bar.

5. The support bracket and guide assembly of claim 4 in which said guide plate further includes a pair of rollers disposed to respective sides of said vertical channel.

6. The support bracket and guide assembly of claim 1 in which said collar is a split cylinder which extends over said rotary spindle.

7. The support bracket and guide assembly of claim 1 wherein said horseshoe member is a semicircular half ring spaced out from said collar and with its ends fastened to the mounting plate of said multiple spindle head.

8. The support bracket and guide assembly of claim 1 wherein said slider means includes an upper flange and a lower flange with said horseshoe member sandwiched therebetween.

9. Support bracket assembly for supporting a milling device on a milling machine of the type that has a base, a horizontal ways supported on said base, and a power head atop said ways and including a rotary spindle to receive a tool shaft; the milling device having a housing and an input shaft extending above said housing and received in said rotary spindle; the support bracket and guide assembly including a support bracket adjustably mounted on said ways, a guide device, and means mounting said guide device on said support bracket; a guide member slidably disposed on said guide device and mounted on said milling device housing to permit vertical movement of the device relative to said ways but to restrain said milling device housing against rotational movement.

10. The support bracket assembly of claim 9 in which one of said guide device and said guide member includes a vertical guide bar, and the other of said guide device and guide member includes a guide plate having a vertical channel formed therein, said guide bar being slidably disposed in said channel.

11. The support bracket assembly of claim 10 in which said guide member also includes an arcuate member mounted on said milling device housing with a center of curvature disposed substantially at the axis of said input shaft, and a slider that is slidably disposed on said arcuate member and including locking means for locking said slider at a selected position along said arcuate member.

* * * * *

UNITED STATES PATENT AND TRADEMARK OFFICE
CERTIFICATE OF CORRECTION

PATENT NO. : 4,717,297

DATED : January 5, 1988

INVENTOR(S) : William J. Camloh et al.

It is certified that error appears in the above-identified patent and that said Letters Patent is hereby corrected as shown below:

Column 4, line 62, "positin" should read "position".

Column 5, line 1, after "another", insert --from respective ones of said plate members towards one another--.

Column 6, line 9, "on" should read "in".

Signed and Sealed this

Fourteenth Day of June, 1988

Attest:

DONALD J. QUIGG

Attesting Officer

Commissioner of Patents and Trademarks